March 2, 1965     W. ANDERSEN     3,171,528
SERRATED ROLLER CONVEYOR
Filed July 17, 1961                        2 Sheets-Sheet 1
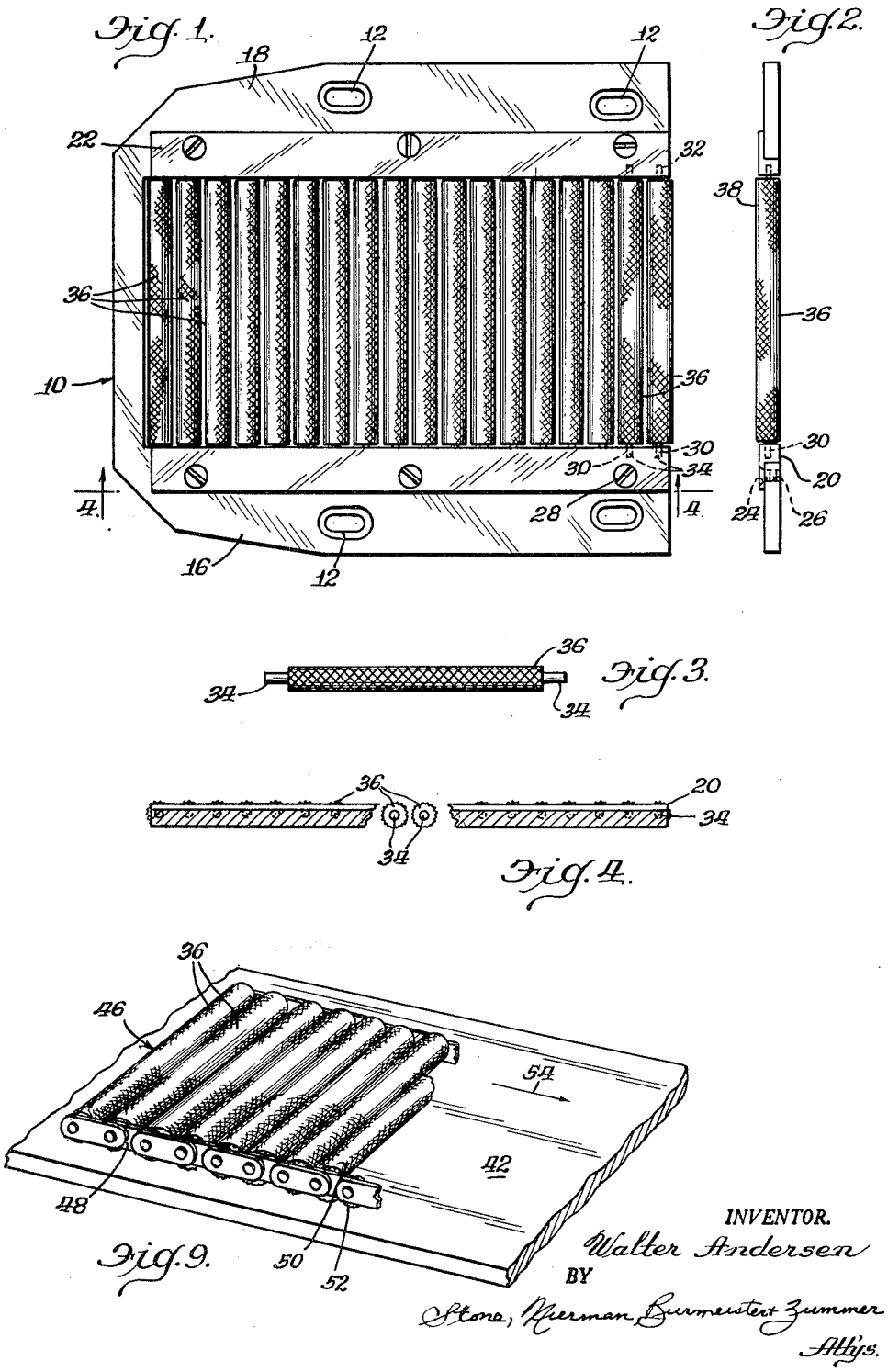
INVENTOR.
Walter Andersen
BY
Stone, Neerman, Burmeister & Zummer
Attys.

March 2, 1965   W. ANDERSEN   3,171,528
SERRATED ROLLER CONVEYOR
Filed July 17, 1961   2 Sheets-Sheet 2

INVENTOR.
Walter Andersen
BY
Stone, Nieman, Burmeister & Zummer
Attys.

United States Patent Office 3,171,528
Patented Mar. 2, 1965

3,171,528
SERRATED ROLLER CONVEYOR
Walter Andersen, Streator, Ill., assignor, by direct and mesne assignments, to Chem-Met-Anderson Engineering Company, Chicago, Ill., a corporation of Illinois
Filed July 17, 1961, Ser. No. 124,473
6 Claims. (Cl. 193—37)

This invention relates to a method of making glass containers, i.e., glass bottles, and particularly to improvements in the step of transferring newly formed hot glass bottles from the delivery station, commonly called the "dead plate," of a bottle-making machine to the loading station of a lehr for tempering the glass, and to the apparatus for performing this method.

The general object of this invention is to transfer hot glassware, that is, a bottle, immediately after leaving a bottle-making machine, to a lehr, without exposing the bottle to sufficient thermal shock to cause checks in the glass, particularly at the bottom chine, and with a minimum drop in its temperature. A glass bottle leaves the glass bottle-making machine at a temperature ranging from 1200–1500° F., and is placed on a dead plate. A dead plate is a flat, foraminous asbestos plate. During this transfer, the bottle temperature drops 300–500° F. Whatever touches the exterior of the bottle, particularly if it is a solid, cools the surface of the glass that is touched. A temperature differential between the outside skin and the inside wall of the bottle occurs. Stresses develop between the two surfaces, particularly around the bottom chine of the bottle, and these appear as check lines which are weaknesses that break during pressure testing.

Figure 5:
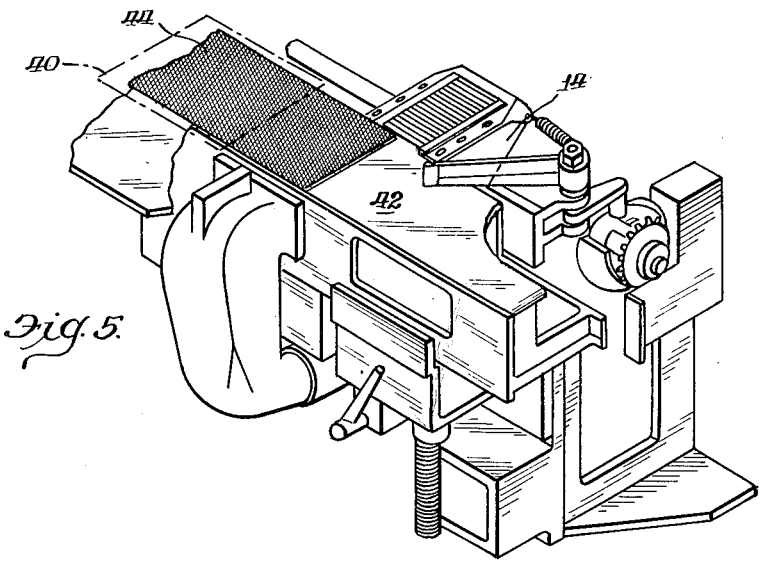

After a few seconds on the dead plate, the erect bottle, setting on its bottom, see FIGURE 1, is moved onto a conveyor made of metal links. Again, the heat in the exterior skin of the glass is partly and quickly removed which further develops check lines. To reduce thermal shock, the conveyor belt 44 of FIGURE 5 is heated.

The first step effecting applicant's method is supporting the bottle on a plurality of posts having small tops whose combined area is less than one percent of the area of the bottom of the bottle. The bottle loses heat only through the tops, which are rounded peaks, and to the ambient air. The effect is to permit the bottle to retain most of its own heat.

To accomplish this step, applicant uses a surface composed of parallel, knurled rollers, the cylindrical surface being covered with pyramidal posts with the tops slightly rounded to prevent stippling of the bottom of the bottle.

The second step is concurrent with the first and comprises heating the posts to a tempertaure close to that of the bottle. This is done by utilizing heat from the bottles. In accomplishing this step, applicant makes the rollers of heat-conductive material so that during continuous operation, the rollers rise to the temperature of the bottles, the rollers losing heat only through the air or through the small bearings in a frame.

The third step of applicant's method is to maintain the thermal relationship of the bottles to whatever is supporting them from the dead plate to the loading station of the lehr. Applicant effects this by utilizing this same type of rollers as the supporting surface in a conveyor, and at the loading station of the lehr.

In designing the means for effecting the steps of the method, applicant had several objects. Firstly, he sought to eliminate mutilation and discoloration of the bottle bottom caused by oil and grit on the present asbestos dead plate, and to eliminate sliding the bottle on an oily and gritty surface. A bottle is pushed off the dead plate onto a conveyor and because this bottom is soft, this pushing frequently results in grime being entrapped in the surface of the bottle bottom. It must be rejected. By placing the round-headed supporting posts on freely rotatable rollers, when the bottle is pushed off the dead plate, there is no sliding between the post tops and the bottle bottom. Any mold cavity oils dropping from the bottle onto the rollers settle in the arrises between the posts, as does any grit. The tops of the posts are self-cleansing, and from time to time the arrises are cleaned.

Another object of this invention is to make the rollers of a material that will hold heat with respect to the ambient air. A high tempered steel will effect this, but when the rollers operate at a temperature close to that of the bottles, they warp and the bearings wear too rapidly. Applicant uses a ceramic-bearing steel which slowly attains the temperature of the bottles but which can withstand load and temperature without warping and excessive wear at the bearings.

Another object is to utilize rollers in a conveyor. Bottle-making machines are costly and at the present time, a conveyor is used between the bottle machine and the lehr. While applicant could utilize means for picking up the dead plate with one or two bottles on it and positioning it before the lehr, the conveyor system is present, and applicant utilizes it by substituting a link conveyor employing the knurled rollers for a chain conveyor.

Figure 7:
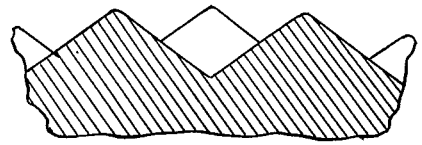
Figure 8:
Figure 10:
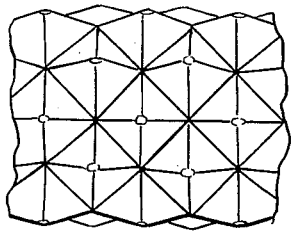
Figure 6:
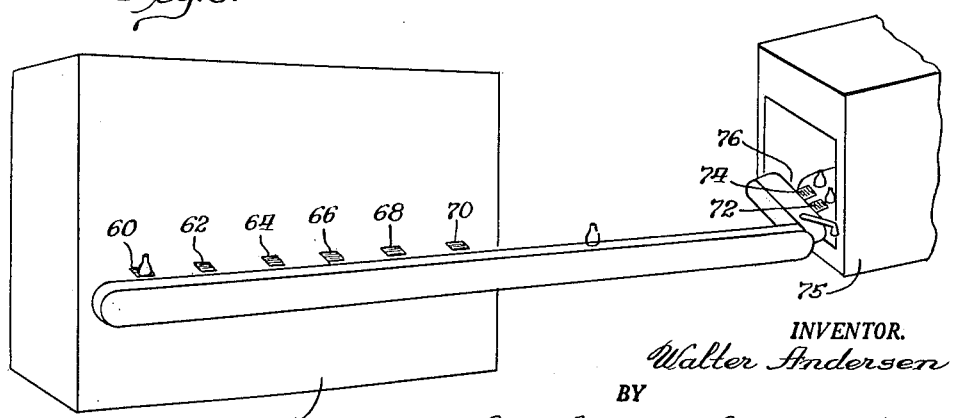

These and such other objects as may hereinafter appear are attained in the embodiment of the invention hereinafter described in connection with the following figures:

FIGURE 1 is a plan view of applicant's dead plate;
FIGURE 2 is a right end elevation thereof;
FIGURE 3 is a side elevation of one of applicant's knurled rollers;
FIGURE 4 is a side view taken on the line 4—4 of FIGURE 1, and partly cut away;
FIGURE 5 is a perspective view of a portion of the delivery table of an I. S. Hartford machine;
FIGURE 6 is a schematic view showing the position of six dead plates on a six-section I. S. Hartford machine with respect to the conveyors terminating in the receiving station of a lehr;
FIGURE 7 is an enlarged sectional view of a portion of a coarse knurled roller;
FIGURE 8 is an enlarged sectional view of a fine knurled roller;
FIGURE 9 is a view of a link chain employing applicant's rollers and substituted for the metal conveyor belt shown in FIGURE 5 or schematically, in FIGURE 6; and,
FIGURE 10 is a side elevation of a portion of one of applicant's dead plate rollers.

Continuing to refer to the drawings, the numeral 10 identifies a U-shaped frame having mounting slots 12 for assembly with the upwardly open orifice of a wind tunnel 14, see FIGURE 5. Returning to FIGURE 1, mounted along the inside edges of the arms 16 and 18 of the U-shaped frame 10 are L-shaped channels 20 and 22. The thin wall of each channel carries holes such as 24 and the arms 16 and 18 are tapped and threaded as at 26 to receive screws such as 28 for fastening the channels to the frame 10. The thick wall of each channel 20 or 22 is tapped at regular intervals, i.e., 30 and 32, to receive trunnions 34 of knurled rollers 36. Referring to FIGURE 2, the tap hole 30 is spaced at a greater distance from the bottom than from the top so that the upper surface 38 of the roller 36 will be in a plane above the upper surface of the channels 20 and 22, thereby keeping a bottle partly projecting over the channels from touching them.

The roller 36 has an external diameter of ⅜ inch and each roller is spaced from the next by $\frac{1}{16}$ inch. The diameter of the trunnion 34 is ⅛ inch, although this is not material. The rollers are on $\frac{7}{16}$-inch centers. A standard (tall) 8-ounce soft drink bottle has an outside diameter at the bottom chine of two inches, so that the bottle will be supported on the dead plate on not more than five rollers and not less than four rollers, see FIGURE 1, where the outside dimensions of two chines are dotted in at the positions they occupy when deposited by the delivery clamps on a two-cavity section of an I. S. Hartford machine. It has been found that the 1/16-inch spacing between the rollers will pass all of the air necessary to force up the bottom of any size bottle required, so that applicant's roller dead plate need not be changed for various size bottles.

The knurling is of the standard square-bottom pyramid type. Experiments have been made with coarse knurl and fine knurl. A section of the coarse knurl is shown in FIGURE 7. This knurl has 16 parallel lines of peaks in 360° of circumference, that is, the lines of the peaks are 22.5° apart. The depth of the knurl is 0.060 inch. FIGURE 8 presents a section of a fine knurl in which there are 24 lines of peaks in 360°, and the depth of the valley is 0.040 inch. There is more contact between the fine knurl and the bottom of a given bottle than between the coarse knurl. The roller having the fine knurl heats up more rapidly than does the coarse knurl, but for practical purposes, in round-the-clock operation, both become equally hot and both tend to be close to the external temperature of the skin of the glass. This reduces heat transference from the glass to the rollers. However, in experiments, the slightly shallower valleys or arrises of the fine knurl are more inclined to accumulate the protective oil from the exterior of the glass, and in extensive experiments, it has been found that the superior cleaning properties of the coarse knurl justify its preference.

Referring now to FIGURE 9, that portion of the top of the delivery table 42 of FIGURE 5 shown within the dash-dot line 40 is presented, but in place of the standard metallic conveyor belt 44, applicant shows a link chain 46 which consists of the standard end plates 48 with applicant's knurled rollers 36 substituted for the ordinary short bearings such as used in bicycle chains. The top surfaces of the rollers such as 50 and the bottom surfaces suggested at 52 are respectively above and below the edges of link plates 48 so that the rollers are in constant engagement with the top 42 of the delivery table. As this chain belt is moved in the direction of the arrow 54, the rollers roll on the delivery table, and a bottle resting on top of the posts on rollers moves along without sliding on the surface of the posts, and the top of the posts do not slide on the table top 42.

Performance

A 90-day test run of lightweight beer containers was made on a standard six-section I. S. Hartford machine with applicant's roller plate 10 of FIGURE 1 being positioned successively during the run at each of the positions 60, 62, 64, 66, 68 and 70, FIGURE 6, an asbestos dead plate being at the other five positions at any one time. Those bottles that had rested on applicant's roller plate 10, after leaving the end of the lehr (not shown in FIGURE 6 as the lehr may be 100 feet long), tested at 250% above the standard 175 p.s.i. minimum, that is, near 500 pounds, whereas the bottles from stations having asbestos plates tested at 190 to 200 p.s.i. The ability of applicant's bottles to withstand this high pressure demonstrates that checking at the chine was minimal. There was substantially no breakage. This favorable result is due to applicant's method of retaining the bottle heat in the bottle, and thereby maintaining a minimum differential of temperature between the outside surface of the glass and the inside surface.

Those bottles which left the section of the glass machine most remote from the lehr, i.e., at station 60, which bottles were longest exposed, and hence most likely to lose temperature, were examined carefully, and while it was found that their ability to resist pressure was less than those that spent less time in the air from the glass machine to the lehr, their ability to withstand pressure still exceeded 200% of the minimum.

The bottoms of the bottles were examined and substantially no ingrained oil or grit appeared on them. During the test run, additional oil and foreign matter in excess of what normally occurs in operation was applied to the rollers of applicant's plate 10, and at the end of the 90-day run, no signs of clogging or roller breakdown had occurred.

It was during this run that both the fine knurl of FIGURE 8 of this application and the coarse knurl of FIGURE 7 were tried, and it was concluded that the smaller number of contact areas, i.e., post tops, of the coarse knurl, and its superior resistance to picking up foreign matter justified its use. Also, the coarser knurl permits slightly more air to pass between the rollers at the dead plate.

During the test, no heat was applied to the conveyor as in standard practice. This effected a substantial saving in gas.

The temperature of the bottles was observed by placing a thermometer in the bottle immediately upon deposit of the bottle on the roller plate at position 60. Depending upon the glass being run and the speed of the bottle machine, temperature declined as follows:

|  | Present Practice with asbestos dead plate, chain conveyor and heaters on conveyor, ° F. | Applicant's Practice with roller plate at positions 60-70 and no heaters on conveyor, ° F. |
| --- | --- | --- |
| Bottle received on dead plate | 700–1,100 | 700–1,100 |
| Bottle to conveyor | 500–700 | 600–900 |
| Bottle to receiving station of lehr | 200–390 | 500–700 |

During the test, air was blown upwardly through the dead plate to place a crown in the bottom of the bottle, as in standard practice.

After the 90-day test, which continued day and night, identical roller-type dead plates such as 10 were positioned at the receiving station 72 and 74 of the lehr, and the bottle machine for a short period of time was operated on one section only, as for example, that at dead plate 70. The purpose of this test was to determine whether or not the fires in front of the lehr, that is, at the point 76, used to maintain the temperature of the transfer plates, could be eliminated, and it was determined that with applicant's roller plates in position and with the burners at the position 76 off, there was no apparent drop in the maximum test pressure which the bottles after passing through the lehr would withstand. When applicant's roller plates were removed and the standard transfer plates replaced, the gas burners in front of the lehr were turned off. The ability of the finished bottles to resist pressure dropped 150 pounds. Then, the gas was turned on in front of the lehr and the output was tested, and it was found that these bottles continued to be at 150 pounds lower test. This established that the bottles going through the machine with applicant's roller plates at the stations 60 through 70 but with standard construction at the entrance to the lehr, tested at 100–150 pounds lower pressure, whereas with the roller plates at the receiving station of the lehr, the bottles withstood 100–150 pounds higher pressure.

The 90-day test established that applicant's roller plate at the delivery position of the bottles on the glass machine lost comparatively little temperature and that the outer skin remained at the temperature differential with the inside wall such that weakening crazes and cracks did not appear. It further demonstrated that this differential in pressure was fairly well maintained between the stations 60–70 and the stations 72 and 74. Tests were made on the temperature of the glass between these two sets of stations, and it was found that the bottles had dropped some 400–500° F. less.

In comparing applicant's roller plate to the existing asbestos plate with respect to the area of contact with the bottom of the bottles, the holes through the asbestos plate constitute about 25% of the area of the bottom of the bottle so that the area of contact is about 75%. To carry out applicant's method of supporting the bottle on a minimum area of support, it is only necessary that the supporting peaks or posts be sufficiently large so that their imprints are not found on the bottom of the bottle. Where some other type of support than a roller is used, the combined area of the supporting posts might be as high as 5%. Actually, the supporting area of the roller plate 10 is well below 1%.

Applicant's roller plate has the further advantage of having a much longer life than the asbestos plate. In the 90-day test described above, applicant's roller plate was not replaced although moved from position to position. The asbestos plates were completely changed twice so that ten new plates were used. However, the change of five plates did not occur for all of the sections at the same time. From five to eight minutes is required to change an asbestos dead plate, and during this time the particular section is down. This resulted in a total down time for the sections having asbestos dead plates of between 50 and 80 minutes for the 90-day run.

Also, it is necessary to wipe the oil and grime off the dead plate at least once every eight-hour shift, and when two bottles are being placed on the dead plate at a time, as often as three times in an eight-hour shift. This wiping is performed while the machine is in operation, and it is difficult to do an effective job with the pushout arm operating over the top of the plate, and with the delivery clamps depositing the bottles.

The oil vapor and grime problem on the asbestos dead plate as well as on all conveyors can be appreciated by stating that on a hot, humid day, despite the finest ventilators, the atmosphere is so clouded that visibility is limited to 25 feet. With each opening of the blank mold and the blow mold, the walls are sprayed with linee oil which has a vaporization point of 50° F. under pressure. There is a puff of oil vapor which escapes before the molds close, and this settles on all parts of the machine. It is the settling of this oil vapor with entrapped dust particles in the air which is responsible for the short life of an asbestos dead plate which has a large surface area. The hot bottles carbonize the oil on the top of the plate so that it readily chips.

The material of the rollers is such that it can be knurled and then case hardened. It has the general definition of low carbon free machine steel capable of case hardening. A specific formula is:

| | Percent |
|---|---|
| Carbon | 0.14–0.20 |
| Manganese | 0.1–1.30 |
| Phosphorus, max. | 0.040 |
| Sulphur | 0.08–1.3 |
| Silicon | 0.10–0.30 |
| Lead | 0.15–0.35 |
| Iron | Balance |

When applicant first decided that the checking around the chine of the bottle was due to excessive thermal contact with the bottle support at the dead plate, he placed grooves in the dead plate between the holes. This was inadequate. The top of the asbestos dead plate is as smooth as finished glass. He then tried wires in these grooves which projected above the top of the dead plate. The glass burned the wires so rapidly that what might be termed a wire grid asbestos dead plate had substantially no life. He also tried inverted hacksaw blades in the grooves which had similarly short life. His next attempt to decrease the area of support for the bottle bottom was by spraying liquid bronze which applicant applied by a gun. The liquid bronze was blown directly on the asbestos dead plate during machine operation. The metal stippled the top of the asbestos dead plate with the result that the bottle was supported on small peaks which might have had as little as 1% of the total area of the bottle bottom. While this accomplished what applicant's roller plate accomplished, it did so only for about 24 hours. A single application cost $40.00. Moreover, the hot bronze crystallized the top of the asbestos dead plate and further shortened its life.

Having thus described applicant's invention, what he claims is:

1. For use in moving hot, formed bottles from one position to another in bottle making equipment, a support for bottles comprising a plurality of like-size, cylindrical, freely rotatable knurled rollers mounted by their ends on support members so that their axes are parallel and lie in a common plane, and raised equal height peaks on the convex surfaces of said rollers, the peaks being so spaced that the combined area of the tops of the peaks supporting the bottom of a bottle is from less than one to five percent of the area of the bottom of the bottle.

2. The bottle support of claim 1 wherein the support members constitute a rigid flat frame of a size and having means for mounting at the dead plate position of a bottle making machine.

3. The bottle support of claim 2 wherein the support members are two parallel articulated chains with the ends of the rollers mounted at the joints.

4. The bottle support of claim 3 in combination with a flat table upon which the rollers mounted in the two chains rest, whereby when the roller assemblage supporting bottles is drawn in a selected direction along the table, the peaks cause the rollers to rotate so that their upper surfaces move in the same direction and the bottles move in that direction at a speed exceeding the speed of the roller assemblage.

5. The bottle support of claim 1 wherein the adjacent concave surfaces of any two rollers are spaced by about one-sixth the diameter of the rollers.

6. The bottle support of claim 1 wherein the peaks on the rollers lie in rows parallel to the roller axes and the number of rows range from 16 to 24 around the 360° of each roller.

References Cited by the Examiner

UNITED STATES PATENTS

| 902,410 | 10/08 | Jackson et al. | |
| 938,385 | 10/09 | Jungers | 65—44 |
| 1,447,648 | 3/23 | Deulin | 198—127 |
| 2,413,979 | 1/47 | Lamb | 198—127 X |
| 2,478,624 | 8/49 | De Vine | 65—69 |
| 2,512,781 | 6/50 | Stewart | 65—69 |
| 2,660,831 | 12/53 | Rowe | 65—348 X |
| 2,953,234 | 9/60 | Abendschein | 198—183 X |
| 2,964,155 | 12/60 | Flowers et al. | 193—35 |
| 3,045,791 | 7/62 | Ayres | 193—35 |
| 3,082,774 | 3/63 | Benton et al. | 198—127 X |

FOREIGN PATENTS 678,007  8/52  Great Britain.

SAMUEL F. COLEMAN, *Primary Examiner.*

DONALD H. SYLVESTER, *Examiner.*